US010252295B2

(12) United States Patent
Takeda et al.

(10) Patent No.: US 10,252,295 B2
(45) Date of Patent: Apr. 9, 2019

(54) LINEAR ACTUATOR

(71) Applicant: NIDEC SANKYO CORPORATION, Suwa-gun, Nagano (JP)

(72) Inventors: Tadashi Takeda, Nagano (JP); Hiroshi Kitahara, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 51 days.

(21) Appl. No.: 15/500,331

(22) PCT Filed: Jul. 21, 2015

(86) PCT No.: PCT/JP2015/070699
§ 371 (c)(1),
(2) Date: Jan. 30, 2017

(87) PCT Pub. No.: WO2016/017474
PCT Pub. Date: Feb. 4, 2016

(65) Prior Publication Data
US 2017/0216885 A1 Aug. 3, 2017

(30) Foreign Application Priority Data

Jul. 30, 2014 (JP) .................. 2014-155280
Jul. 30, 2014 (JP) .................. 2014-155281
Jul. 30, 2014 (JP) .................. 2014-155282

(51) Int. Cl.
*H02K 33/00* (2006.01)
*B06B 1/04* (2006.01)
(Continued)

(52) U.S. Cl.
CPC ............. *B06B 1/045* (2013.01); *H01F 7/088* (2013.01); *H01F 7/1615* (2013.01); *H02K 33/00* (2013.01); *H02K 33/02* (2013.01); *H02K 33/18* (2013.01)

(58) Field of Classification Search
CPC ........ H02K 33/00; H02K 35/02; H02K 35/00; H02K 33/18; H02K 7/1876
(Continued)

(56) References Cited

U.S. PATENT DOCUMENTS 1,365,624 A   1/1921 Newhall
5,903,076 A * 5/1999 Suyama .................. B06B 1/045
                                                                310/13
(Continued)

FOREIGN PATENT DOCUMENTS

EP    0791405 A1    8/1997
EP    1053794 A1    11/2000
(Continued)

OTHER PUBLICATIONS

International Search Report corresponding to Application No. PCT/JP2015/070699; dated Aug. 18, 2015, with English translation.
(Continued)

*Primary Examiner* — Thanh Lam
(74) *Attorney, Agent, or Firm* — Cantor Colburn LLP

(57) ABSTRACT

A linear actuator may include a movable element including a cylindrical permanent magnet; a stationary element including a coil bobbin that surrounds the permanent magnet at an outside in a radial direction; a spring member connected to the movable element and the coil bobbin, and supporting the movable element to be movable in an axial direction in relation to the coil bobbin; a coil wound around the coil bobbin, for configuring a magnetic drive mechanism together with the permanent magnet, the magnetic drive
(Continued)

mechanism being structured to drive the movable element in the axial direction; and a gel damper member being sandwiched between the stationary element and the movable element in the axial direction.

20 Claims, 8 Drawing Sheets

(51) Int. Cl.
*H02K 33/18* (2006.01)
*H01F 7/08* (2006.01)
*H01F 7/16* (2006.01)
*H02K 33/02* (2006.01)

(58) Field of Classification Search
USPC .................................. 310/15, 25, 23, 27, 194
See application file for complete search history.

(56) References Cited

U.S. PATENT DOCUMENTS

| 8,120,214 B2* | 2/2012 | Jeon | ........................ | H02K 33/18 |
| | | | | 310/14 |
| 8,598,750 B2* | 12/2013 | Park | ........................ | B06B 1/045 |
| | | | | 310/15 |
| 2010/0277010 A1 | 11/2010 | Jeon | | |
| 2011/0180980 A1 | 7/2011 | Urayama et al. | | |
| 2011/0260560 A1* | 10/2011 | Park | ........................ | H02K 33/16 |
| | | | | 310/25 |
| 2012/0146433 A1* | 6/2012 | Jeong | ........................ | H02K 33/16 |
| | | | | 310/25 |
| 2013/0342035 A1 | 12/2013 | Kim | | |

FOREIGN PATENT DOCUMENTS

| EP | 1096650 A1 | 5/2001 |
| EP | 1775991 A1 | 4/2007 |
| EP | 3121946 A1 | 1/2017 |
| JP | 2000023439 A | 1/2000 |
| JP | 2003080171 A | 3/2003 |
| JP | 2006007161 A | 1/2006 |
| JP | 2006050693 A | 2/2006 |
| JP | 2006220775 A | 8/2006 |
| JP | 2009166016 A | 7/2009 |
| JP | 2012135755 A | 7/2012 |

OTHER PUBLICATIONS

Extended European Search Report for corresponding EP15827480.3 dated Jun. 19, 2018.
EP Partial Supplementary Search Report for corresponding EP15827480.3, dated Feb. 15, 2018.

* cited by examiner

LINEAR ACTUATOR

CROSS REFERENCE TO RELATED APPLICATIONS

This is the U.S. national stage of application No. PCT/JP2015/070699, filed on Jul. 21, 2015. Priority under 35 U.S.C. § 119(a) and 35 U.S.C. § 365(b) is claimed from Japanese Application Nos. 2014-155280, filed Jul. 30, 2014; 2014-155281, filed Jul. 30, 2014; and 2014-155282, filed Jul. 30, 2014; the disclosures of which are incorporated herein by reference.

FIELD OF THE INVENTION

At least an embodiment of the present invention relates to a linear actuator provided with a magnetic drive mechanism.

BACKGROUND

In an industrial field of mobile phones and the like, there is used a device that notifies of an incoming call and the like, by way of a vibration; and as such a device, there is proposed a linear actuator in which a movable element equipped with a permanent magnet is provided to a stator, wherein the linear actuator is activated by a coil (refer to Patent Document 1 and Patent Document 2). Using such a linear actuator makes it possible to change an intensity level and a frequency of vibration, with a driving signal to be supplied to the coil.

PATENT DOCUMENTS

Patent Document 1: Japanese Unexamined Patent Application Publication No. 2012-135755
Patent Document 2: Japanese Unexamined Patent Application Publication No. 2006-7161

In a linear actuator provided with a magnetic drive mechanism, it is needed to supply a sufficient thrust force, for making up a configuration in which an intensity level and a frequency of vibration are changeable, according to a driving signal to be supplied to the coil. Meanwhile, unfortunately a great thrust force cannot be obtained in the case where a coil is placed around a supporting shaft and a permanent magnet is located around the coil, as a configuration described in Patent Document 2. Although having said that; if a plurality of permanent magnets are placed in an axial direction, the number of constituent parts increases greatly so that a cost of the linear actuator increases. Furthermore, in a configuration of a linear actuator described in Patent Document 2, a movable element is supported by a supporting shaft that passes through the movable element, so that there also exists an unfavorable issue that the number of constituent parts is great. Moreover, with regard to the configuration described in Patent Document 2, furthermore there also exists an unfavorable issue that the movable element may enter into resonance, depending on a frequency of vibration, at a time when the movable element vibrates.

With the issue described above being taken into consideration, there is a need to provide a linear actuator that can generate an adequate vibration of a movable element even with a limited number of constituent parts.

Moreover, in a linear actuator provided with a magnetic drive mechanism, it is needed to supply a sufficient thrust force, for making up a configuration in which an intensity level and a frequency of vibration are changeable, according to a driving signal to be supplied to the coil. Meanwhile, unfortunately a great thrust force cannot be obtained in the case where a coil is placed around a supporting shaft and a permanent magnet is located around the coil, as a configuration described in Patent Document 2. Therefore, one may employ a configuration in which a coil is wound around a coil bobbin that surrounds a permanent magnet at an outside in a radial direction. Furthermore, the permanent magnet is provided with a first core that overlaps at one side in an axial direction, and a second core that overlaps at the other side in the axial direction; wherein the second core is provided with an end plate part that overlaps with the permanent magnet at the other side in the axial direction, and a tubular side plate part that stretches toward the one side in the axial direction from an outer edge of the end plate part in such a way as to surround the coil at an outer side in a radial direction.

Meanwhile, in order to configure the second core provided with the end plate part and the tubular side plate part, a drawing process should be employed; and unfortunately there exists a restriction in the case of such a drawing process, on a thickness of a magnetic plate. Accordingly, there is an issue that the end plate part of the second core cannot be formed in such a way as to have a sufficient thickness.

With the issue described above being taken into consideration, there is a need to provide a linear actuator in which an end plate part can have a sufficient thickness in a core provided with an end plate part and a tubular side plate part.

Furthermore, in a linear actuator provided with a magnetic drive mechanism, it is needed to supply a sufficient thrust force, for making up a configuration in which an intensity level and a frequency of vibration are changeable, according to a driving signal to be supplied to the coil. Meanwhile, unfortunately a great thrust force cannot be obtained in the case where a coil is placed around a supporting shaft and a permanent magnet is located around the coil, as a configuration described in Patent Document 2. Therefore, one may employ a configuration in which a is wound around a coil bobbin that surrounds a permanent magnet at an outside in a radial direction. In the meantime, the permanent magnet is provided with a first core that overlaps at one side in an axial direction, and a second core that overlaps at the other side in the axial direction; wherein the second core is provided with an end plate part that overlaps with the permanent magnet at the other side in the axial direction, and a tubular side plate part that stretches toward the one side in the axial direction from an outer edge of the end plate part in such a way as to surround the coil at an outer side in a radial direction. According to such a configuration, a stopper can be configured, by making use of a second flange part positioned at the other side in relation to a first flange part in an axial direction, in a coil bobbin, and a second core.

Unfortunately, for configuring the stopper by making use of the second flange part of the coil bobbin, a thickness of the second flange part is thin and the second flange part does not have a sufficient strength.

With the issue described above being taken into consideration, there is a need to provide a linear actuator in which a stopper can be configured, by making use of a second flange part positioned at the other side in relation to a first flange part in an axial direction, in a coil bobbin.

SUMMARY

In order to solve the first issue described above, a linear actuator according to at least an embodiment of the present invention includes: a movable element provided with a permanent magnet being cylindrical; a stationary element provided with a coil bobbin that surrounds the permanent magnet at an outside in a radial direction; a spring member connected to the movable element and the coil bobbin, while having the movable element to be supported in such a way as to be movable in an axial direction in relation to the coil bobbin; a coil wound around the coil bobbin, for configuring a magnetic drive mechanism together with the permanent magnet to drive the movable element in the axial direction; and a gel damper member being sandwiched between the stationary element and the movable element in the axial direction.

In at least an embodiment of the present invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, the movable element is provided with the permanent magnet being cylindrical, while the coil is wound around the coil bobbin that surrounds the permanent magnet at the outside in the radial direction, in the stationary element. Therefore, the permanent magnet and the coil can have a large diameter; so that even with a simple configuration provided with the permanent magnet being a single set, a great thrust force can be supplied to the movable element. Moreover, with a simple configuration of the gel damper member being sandwiched between the stationary element and the movable element in the axial direction, a resonance of the movable element can be suppressed. Furthermore, since the movable element is supported by the spring member, at the outside in the radial direction of the permanent magnet, no tilt is likely to happen to the movable element, even without supporting the movable element by use of a supporting shaft. Therefore, according to at least an embodiment of the present invention, the linear actuator can be configured with a limited number of constituent elements; and furthermore, an adequate vibration can be generated with the movable element.

In at least an embodiment of the present invention, the coil bobbin includes; a bottom plate part that overlaps with the movable element at one side in the axial direction, and a cylindrical part protruding from the bottom plate part toward the other side in the axial direction so as to surround the permanent magnet at an outside in a radial direction; and in the bottom plate part, a slit overlapping with a gap in a view from the axial direction is formed at a plurality of positions in a circumferential direction, the gap being configured between an inner circumferential surface of the cylindrical part and an outer circumferential surface of the movable element. According to the configuration, at a time of assembling the linear actuator, the gap can appropriately be provided between the inner circumferential surface of the cylindrical part and the outer circumferential surface of the movable element by way of placing a jig, such as a spacer, through the slit. Accordingly, since a width of the gap can appropriately be set at any position in the circumferential direction, no tilt is likely to happen to the movable element, even without supporting the movable element by use of a supporting shaft.

In at least an embodiment of the present invention, the movable element includes; a first core that overlaps with the movable element at one side in the axial direction, and a second core that overlaps with the permanent magnet at the other side in the axial direction; the first core has a larger diameter than the permanent magnet; and the gap is located between the inner circumferential surface of the cylindrical part and an outer circumferential surface of the first core. According to the configuration, being compared to a case where a positioning process is carried out between the outer circumferential surface of the permanent magnet and the inner circumferential surface of the cylindrical part, a positioning process between the outer circumferential surface of the movable element and the inner circumferential surface of the cylindrical part can be carried out more easily.

In at least an embodiment of the present invention, the stationary element is provided with a fixed plate that overlaps with the bottom plate part at a side opposite to the movable element. According to the configuration, one side in the axial direction can be covered with the fixed plate, and therefore a foreign object is unlikely to enter a space between the outer circumferential surface of the movable element and the inner circumferential surface of the cylindrical part, and the like.

In at least an embodiment of the present invention, the fixed plate covers the slit from a side opposite to the movable element. According to the configuration, a space between the movable element and the coil bobbin, as well as a space between the movable element and the fixed plate function as an air damper. Accordingly, a resonance of the movable element can be suppressed far more sure, in comparison to a case where only the gel damper member is used. Furthermore, since the space between the movable element and the coil bobbin, as well as the space between the movable element and the fixed plate function as an air damper, a requirement expected of the gel damper member can be eased.

In at least an embodiment of the present invention, in the first core and the bottom plate part, there are formed through holes inside which the gel damper member is located; and the gel damper member is sandwiched between the fixed plate and the movable element in the axial direction. According to the configuration, being compared to a case where the gel damper member is positioned between the permanent magnet and the coil bobbin, this case makes it possible to enlarge a space for a placement of the gel damper member, in the axial direction. Therefore, as the gel damper member, a component having a large dimension in the axial direction can be placed so that a resonance of the movable element can be suppressed far more sure.

In at least an embodiment of the present invention, between the fixed plate and the movable element, there stretches an opening part in a circumferential direction, which opens toward an outside in a radial direction; and the fixed plate is provided with an adhesive component alongside of the opening part. According to the configuration, a foreign object is unlikely to enter the space between the outer circumferential surface of the movable element and the inner circumferential surface of the cylindrical part, and the like.

In at least an embodiment of the present invention, the adhesive component is provided in a groove that is formed on a surface of the fixed plate at the other side in the axial direction. According to the configuration, a space for placing the adhesive component can easily be secured.

In at least an embodiment of the present invention, the gel damper member is, for example, made from silicone gel.

In order to solve the second issue described above, a linear actuator according to at least an embodiment of the present invention includes: a movable element provided with a permanent magnet; a stationary element provided with a coil bobbin that surrounds the permanent magnet at an outside in a radial direction; a spring member connected to the movable element and the coil bobbin, while having the movable element to be supported in such a way as to be movable in an axial direction in relation to the coil bobbin; and a coil wound around the coil bobbin, for configuring a magnetic drive mechanism together with the permanent magnet to drive the movable element in the axial direction; wherein, the movable element is provided with a first core that overlaps with the permanent magnet at one side in the axial direction, and a second core that overlaps with the permanent magnet at the other side in the axial direction; and the second core is provided with; a first magnetic plate including an end plate part that overlaps with the permanent magnet at the other side in the axial direction, and a side plate part cylindrically shaped, which stretches from an outer edge of the end plate part toward one side in the axial direction so as to surround the coil at an outside in a radial direction; and a second magnetic plate being stacked on the end plate part.

In at least an embodiment of the present invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, in the stationary element, the coil is wound around the coil bobbin that surrounds the permanent magnet at the outside in the radial direction. Therefore, the permanent magnet and the coil can have a large diameter, so that a great thrust force can be supplied to the movable element. Moreover, the permanent magnet is provided with the first core that overlaps at the one side in the axial direction and the second core that overlaps at the other side in the axial direction so that the density of magnetic flux in linkage with the coil can be made high. Meanwhile, the second core is provided with the first magnetic plate including the end plate part and the side plate part, and the second magnetic plate being stacked on the end plate part; and therefore, even in the case where a restriction on a thickness exists, owing to a limitation in a drawing process for the first magnetic plate, the end plate part of the second core can have a sufficient thickness. Accordingly, the density of magnetic flux in linkage with the coil can be made high so that a great thrust force can be supplied to the movable element.

In at least an embodiment of the present invention, a configuration may be employed in such a way that a sum of a plate thickness of the end plate part and a plate thickness of the second magnetic plate is greater than a plate thickness of the first core. In at least an embodiment of the present invention, the second magnetic plate is stacked on the end plate part of the first magnetic plate, and therefore, the end plate part of the second core can have a sufficient thickness. Accordingly, the density of magnetic flux in linkage with the coil can be made high so that a great thrust force can be supplied to the movable element.

In at least an embodiment of the present invention, it is preferable to include a gel damper member being sandwiched between the stationary element and the movable element in the axial direction. According to the configuration, a resonance of the movable element can be suppressed.

In at least an embodiment of the present invention, in the first core, there is formed a through hole inside which the gel damper member is located; and the gel damper member is sandwiched between the permanent magnet and the stationary element. According to the configuration, it is possible to enlarge a space for a placement of the gel damper member in the axial direction. Therefore, as the gel damper member, a component having a large dimension in the axial direction can be placed so that a resonance of the movable element can be suppressed far more sure.

In at least an embodiment of the present invention, the gel damper member is, for example, made from silicone gel.

In order to solve the third issue described above, a linear actuator according to at least an embodiment of the present invention includes: a movable element provided with a permanent magnet; a stationary element provided with a coil bobbin that surrounds the permanent magnet at an outside in a radial direction; a spring member connected to the movable element and the coil bobbin, while having the movable element to be supported in such a way as to be movable in an axial direction in relation to the coil bobbin; and a coil wound around the coil bobbin, for configuring a magnetic drive mechanism together with the permanent magnet to drive the movable element in the axial direction; wherein, the movable element is provided with a first core that overlaps with the permanent magnet at one side in the axial direction, and a second core that overlaps with the permanent magnet at the other side in the axial direction, the second core having an end plate part, a cylindrical side plate part stretching from an outer edge of the end plate part toward the other side in the axial direction so as to surround the coil at an outside in a radial direction, and a protrusion protruding from the side plate part toward an inner side in a radial direction; and the coil bobbin includes; a tubular torso part around which the coil is wound, a first flange part which is expanded in its diameter toward an outer side in a radial direction from an end part of the tubular torso part at one side in the axial direction, a second flange part which is expanded in its diameter toward an outer side in a radial direction from the tubular torso part at the other side in the axial direction in relation to the first flange part, the second flange part facing the protrusion at the other side in the axial direction, and facing an inner surface of the side plate part at an inner side in a radial direction, and a reinforcing rib leading to the second flange part, at the other side in the axial direction, in relation to the second flange part in an outer circumferential surface of the tubular torso part.

In at least an embodiment of the present invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, in the stationary element, the coil is wound around the coil bobbin that surrounds the permanent magnet at the outside in the radial direction. Therefore, the permanent magnet and the coil can have a large diameter, so that a great thrust force can be supplied to the movable element. Moreover, in the coil bobbin, there is the reinforcing rib leading to the second flange part; the reinforcing rib being positioned at the other side in the axial direction, in relation to the second flange part: the second flange being positioned at the other side in the axial direction, in relation to the first flange part. Therefore, the second flange part has a sufficient strength, and it is possible to configure a stopper by making use of the second flange part.

In at least an embodiment of the present invention, the spring member is a flat spring component provided with a stationary-element-side connection part connected to an end part of the tubular torso part at the other side in the axial direction, a movable-element-side connection part connected to the side plate part, and an arm part connected to the stationary-element-side connection part and the movable-element-side connection part; and the reinforcing rib is located at a position displaced in a circumferential direction from a connecting location between the movable-element-side connection part and the arm part. According to the configuration, the reinforcing rib and the arm part of the spring member are unlikely to interfere with each other, even though the reinforcing rib is provided to the coil bobbin.

In at least an embodiment of the present invention, the reinforcing rib has its slope surface facing toward the other side in the axial direction; the slope surface tilting from the other side toward one side in the axial direction, along an stretching direction of the arm part; the slope surface starting from the connecting location for connection of the arm part to the movable-element-side connection part. According to the configuration, the reinforcing rib can be formed in a wide range in the circumferential direction, while avoiding interference of the reinforcing rib with the arm part of the spring member.

At least an embodiment of the present invention, may include a gel damper member being sandwiched between the stationary element and the movable element in the axial direction. According to the configuration, a resonance of the movable element can be suppressed.

In at least an embodiment of the present invention, in the first core, there is formed a through hole inside which the gel damper member is located; and the gel damper member is sandwiched between the permanent magnet and the stationary element. According to the configuration, it is possible to enlarge a space for a placement of the gel damper member in the axial direction. Therefore, as the gel damper member, a component having a large dimension in the axial direction can be placed so that a resonance of the movable element can be suppressed far more sure.

In at least an embodiment of the present invention, the gel damper member is, for example, made from silicone gel.

In the first invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, the movable element is provided with the permanent magnet being cylindrical, while the coil is wound around the coil bobbin that surrounds the permanent magnet at the outside in the radial direction, in the stationary element. Therefore, the permanent magnet and the coil can have a large diameter; so that even with a simple configuration provided with the permanent magnet being a single set, a great thrust force can be supplied to the movable element. Moreover, with a simple configuration of the gel damper member being sandwiched between the stationary element and the movable element in the axial direction, a resonance of the movable element can be suppressed. Furthermore, the spring member is connected to the coil bobbin that surrounds the permanent magnet of the movable element, at the outside in the radial direction, in such a way that the movable element is supported by the spring member, at the outside in the radial direction. Accordingly, no tilt is likely to happen to the movable element, even without supporting the movable element by use of a supporting shaft. Therefore, according to at least an embodiment of the present invention, the linear actuator can be configured with a limited number of constituent elements; and furthermore, an adequate vibration can be generated with the movable element.

In the second invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, in the stationary element, the coil is wound around the coil bobbin that surrounds the permanent magnet at the outside in the radial direction. Therefore, the permanent magnet and the coil can have a large diameter, so that a great thrust force can be supplied to the movable element. Moreover, the permanent magnet is provided with the first core that overlaps at the one side in the axial direction and the second core that overlaps at the other side in the axial direction so that the density of magnetic flux in linkage with the coil can be made high. Meanwhile, the second core is provided with the first magnetic plate including the end plate part and the side plate part, and the second magnetic plate being stacked on the end plate part; and therefore, even in the case where a restriction on a thickness exists, owing to a limitation in a drawing process for the first magnetic plate, the end plate part of the second core can have a sufficient thickness. Accordingly, the density of magnetic flux in linkage with the coil can be made high so that a great thrust force can be supplied to the movable element.

In the third invention, the magnetic drive mechanism is employed for driving the movable element; and moreover, the spring member is connected between the movable element and the stationary element, and therefore, the movable element can be driven in the axial direction, by making use of a driving force by the magnetic drive mechanism and a biasing force of the spring member. Furthermore, in the stationary element, the coil is wound around the coil bobbin that surrounds the permanent magnet at the outside in the radial direction. Therefore, the permanent magnet and the coil can have a large diameter, so that a great thrust force can be supplied to the movable element. Moreover, in the coil bobbin, there is the reinforcing rib leading to the second flange part; the reinforcing rib being positioned at the other side in the axial direction, in relation to the second flange part: the second flange being positioned at the other side in the axial direction, in relation to the first flange part. Therefore, the second flange part has a sufficient strength, and it is possible to configure a stopper by making use of the second flange part.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention are explained below with reference to the drawings. Meanwhile, in the explanation below, an axis line 'L' is a central axis line of a movable element 6, and the axis line 'L' goes through a gravity center of the movable element 6. Then, in the explanation below, the explanation is made on the assumption that, in a direction where the axis line 'L' stretches (an axial direction), a side where the movable element 6 is positioned is referred to as "one side L1" and a side where a fixed plate 4 of a stationary element 2 is positioned is referred to as "the other side L2."

First Embodiment (General Configuration)

Figure 1:
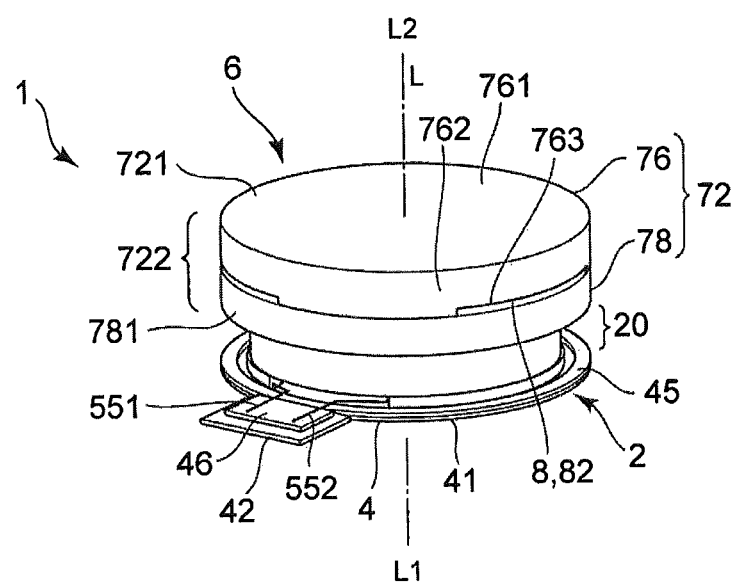
FIG. 1 is a perspective view of a linear actuator according to a first embodiment of the present invention.
Figure 2:
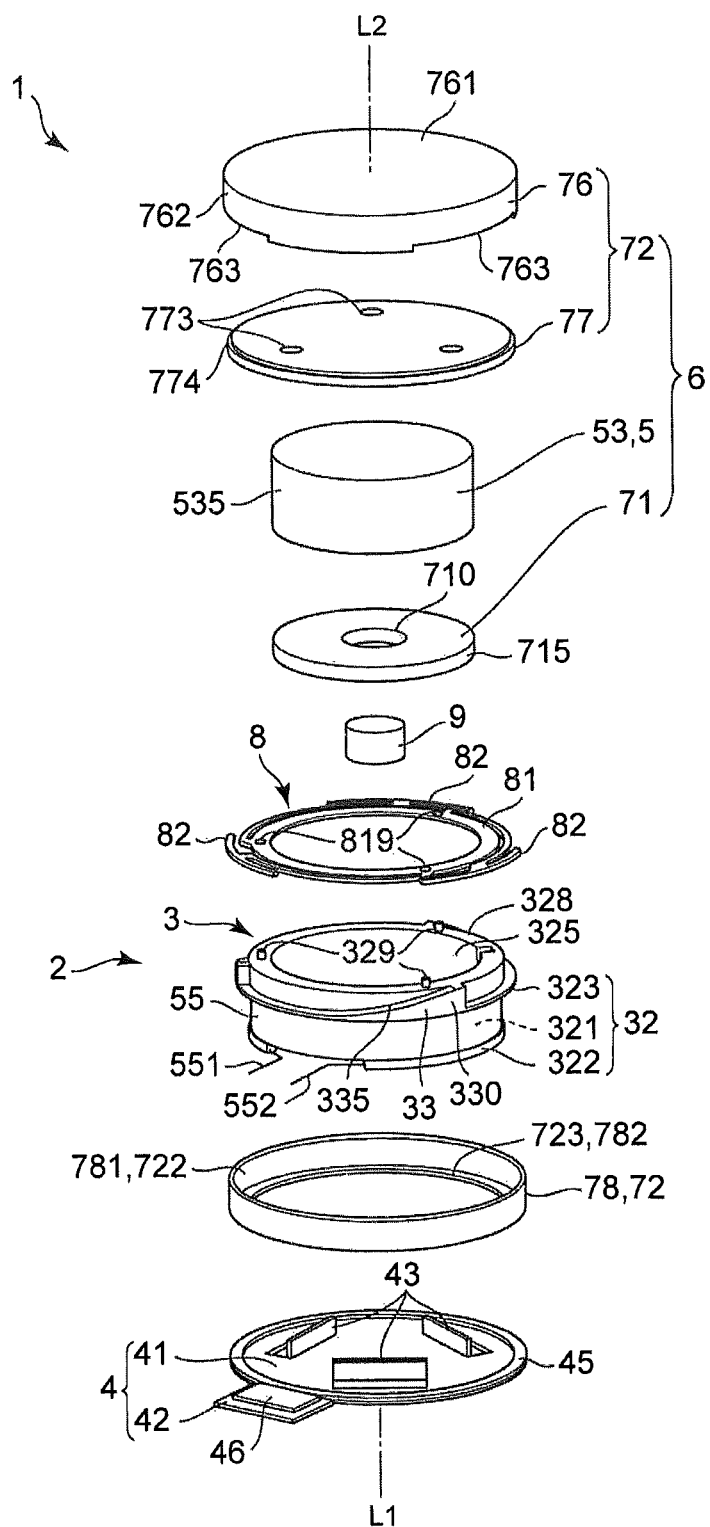
FIG. 2 is an exploded perspective view of the linear actuator according to the first embodiment of the present invention.
Figure 3A:
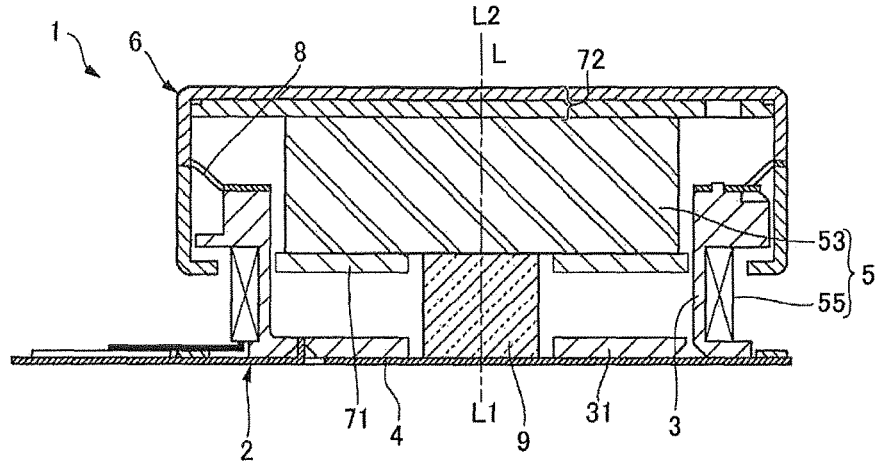
FIGS. 3(a) through 3(c) include sectional views of the linear actuator according to the first embodiment of the present invention.
Figure 3B:
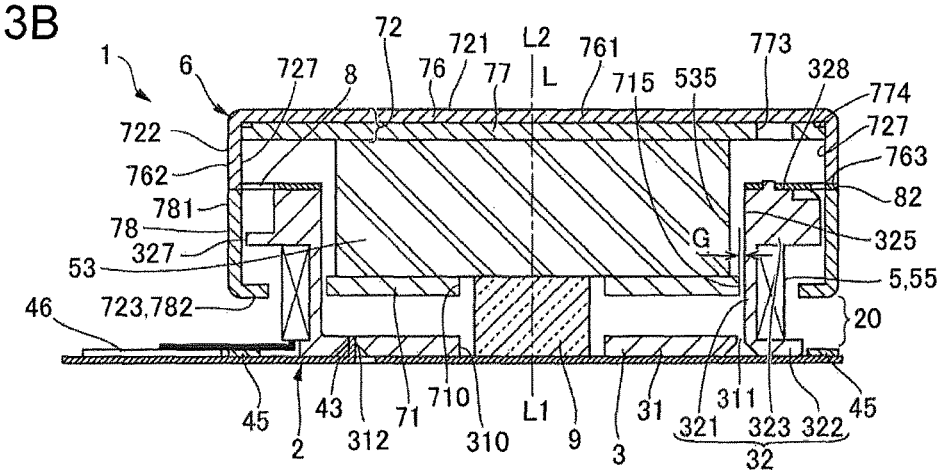
Figure 3C:
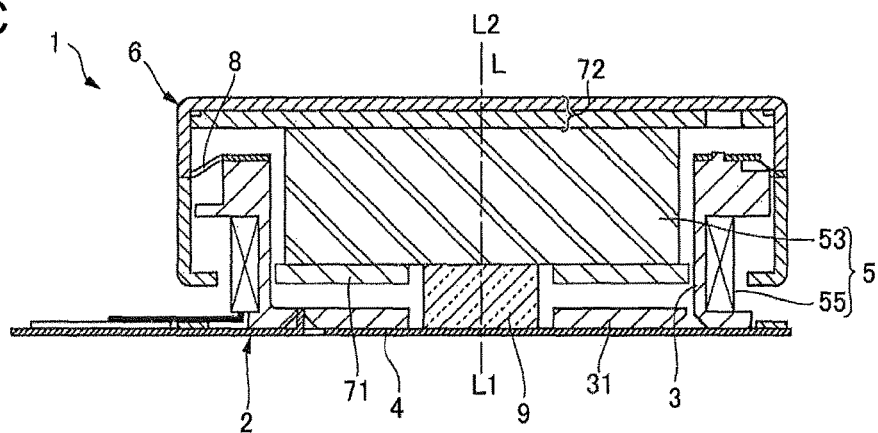

FIG. 1 is a perspective view of a linear actuator 1 according to a first embodiment of the present invention. FIG. 2 is an exploded perspective view of the linear actuator 1 according to the first embodiment of the present invention. FIG. 3 includes sectional views of the linear actuator 1 according to the first embodiment of the present invention; wherein FIG. 3A, FIG. 3B, and FIG. 3C are a sectional view of a situation where the movable element 6 is positioned at the other side 'L2' in a direction of the axis line 'L', a sectional view of a situation where the movable element 6 is positioned at a middle position (an origin position) in the direction of the axis line 'L', and a sectional view of a situation where the movable element 6 is positioned at the one side 'L1' in the direction of the axis line 'L', respectively.

As shown in FIG. 1, FIG. 2, and FIG. 3C; the linear actuator 1 according to the present embodiment includes; a stationary element 2, a movable element 6, and a spring member 8 connected to the movable element 6 and the stationary element 2; wherein, the spring member 8 supports the movable element 6 so as to be movable in the direction of the axis line 'L' with respect to the stator 2. Meanwhile, the linear actuator 1 includes a magnetic drive mechanism 5 in order to drive the movable element 6 in the direction of the axis line 'L'.

(Configuration of the Movable Element 6)

The movable element 6 has a permanent magnet 53 that configures the magnetic drive mechanism 5. The permanent magnet 53 is cylindrical, having the axis line 'L' as its central axis line; wherein the magnetic drive mechanism 5 is magnetized so as to have a north pole and a south pole in the direction of the axis line 'L'. Then, the movable element 6 includes a first core 71 that overlaps with the permanent magnet 53 at one side 'L1' in the axial direction, and a second core 72 that overlaps with the permanent magnet 53 at the other side 'L2' in the direction of the axis line 'L'.

The first core 71 is annular-shaped, having the axis line 'L' as its center, and being provided with a through hole 710 at the center. Then, the first core 71 has its outer diameter that is slightly greater than an outer diameter of the permanent magnet 53, so that an outer circumferential surface 715 of the first core 71 projects externally in a radial direction, in relation to an outer circumferential surface 535 of the permanent magnet 53. The first core 71 is fixed to a surface of the permanent magnet 53, which is located at the one side 'L1' in the direction of the axis line 'L', by means of adhesion and the like.

The second core 72 is provided with an end plate part 721 that overlaps with the permanent magnet 53 at the other side 'L2' in the direction of the axis line 'L', and a side plate part 722 cylindrically shaped, which stretches from an outer edge of the end plate part 721, toward one side 'L1' in the direction of the axis line 'L'. Moreover, at an end part of the side plate part 722, of one side 'L1' in the direction of the axis line 'L'; there is provided a protrusion 723 as a stopper, which protrudes toward an inner side in a radial direction. In the present embodiment, the second core 72 is configured with three magnetic plates (a first magnetic plate 76, a second magnetic plate 77, and a third magnetic plate 78).

The first magnetic plate 76 is provided with an end plate part 761 circularly shaped, which overlaps with the permanent magnet 53 at the other side 'L2' in the direction of the axis line 'L', and a side plate part 762 cylindrically shaped, which stretches from an outer edge of the end plate part 761, toward one side 'L1' in the direction of the axis line 'L'. The second magnetic plate 77 is discoid, being slightly smaller than the end plate part 761 of the first magnetic plate 76, and the second magnetic plate 77 is stacked on the end plate part 761 of the first magnetic plate 76 at the one side 'L1' in the direction of the axis line 'L'. In such a situation, the magnetic plate 77 is welded to the end plate part 761 of the first magnetic plate 76, by making use of an edge of a hole 773 and the like. Therefore, the end plate part 721 of the second core 72 is configured with the end plate part 761 of the first magnetic plate 76, and the second magnetic plate 77. Accordingly, a thickness of the end plate part 721 of the second core 72 is corresponding to a sum of a plate thickness of the end plate part 761 of the first magnetic plate 76 and a plate thickness of the second magnetic plate 77; and the thickness of the end plate part 721 of the second core 72 is thicker than a plate thickness of the first core 71. Incidentally, on a surface of the second magnetic plate 77 at the other side 'L2' in the direction of the axis line 'L', a step part 774 is formed along an outer circumferential rim.

The third magnetic plate 78 has a cylindrical torso part 781; and meanwhile an end part of the torso part 781 at the other side 'L2' in the direction of the axis line 'L' is connected to an end part of the side plate part 762 of the first magnetic plate 76 at one side 'L1' in the direction of the axis line 'L', by way of welding and the like. Therefore, the side plate part 722 of the second core 72 is configured with the side plate part 762 of the first magnetic plate 76, and the torso part 781 of the third magnetic plate 78. In the meantime, at the end part of the side plate part 762 of the first magnetic plate 76 at the one side 'L1' in the direction of the axis line 'L', there are formed cutout parts 763 at a plurality of positions in a circumferential direction. Then, at a time of connecting the side plate part 762 of the first magnetic plate 76 and the torso part 781 of the third magnetic plate 78 by way of welding and the like, a movable-element-side connection part 82 of the spring member 8, to be described later, is held at the cutout parts 763. Moreover, the third magnetic plate 78 has an annular part 782 that is bent toward an inner side in a radial direction at an end part of the torso part 781 of one side 'L1' in the direction of the axis line 'L'; and the protrusion 723 as a stopper of the second core 72 is configured with the annular part 782. With regard to the second core 72 configured in this way, the second magnetic plate 77 is fixed to a surface of the permanent magnet 53 at the other side 'L2' in the direction of the axis line 'L', by means of adhesion and the like.

(Configuration of the Stationary Element 2)

Figure 4A:
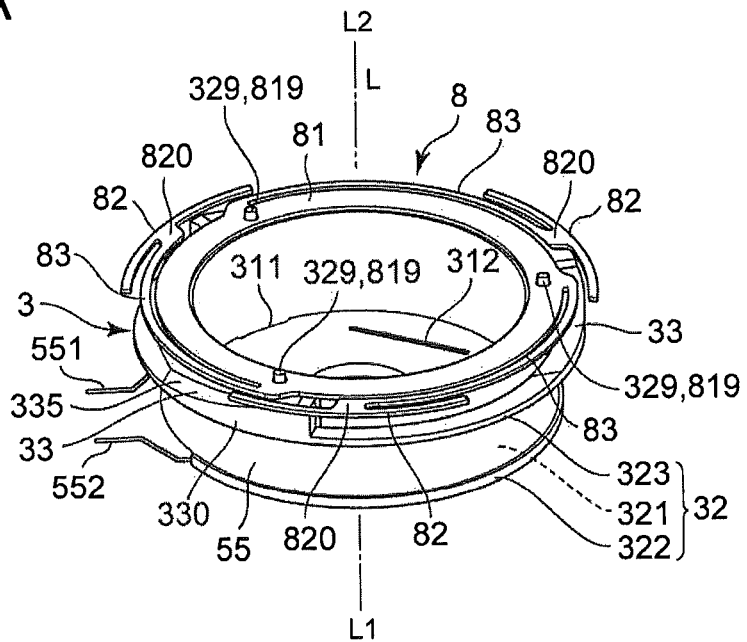
FIGS. 4(a) through 4(b) include perspective views showing a situation where a coil bobbin around which a coil is wound is equipped with a spring component 8, in the linear actuator according to the first embodiment of the present invention.
Figure 4B:
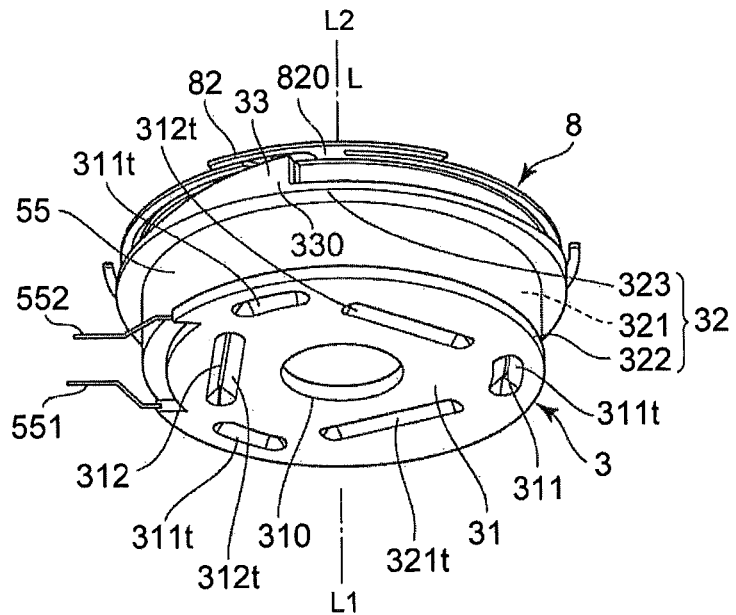
Figure 5:
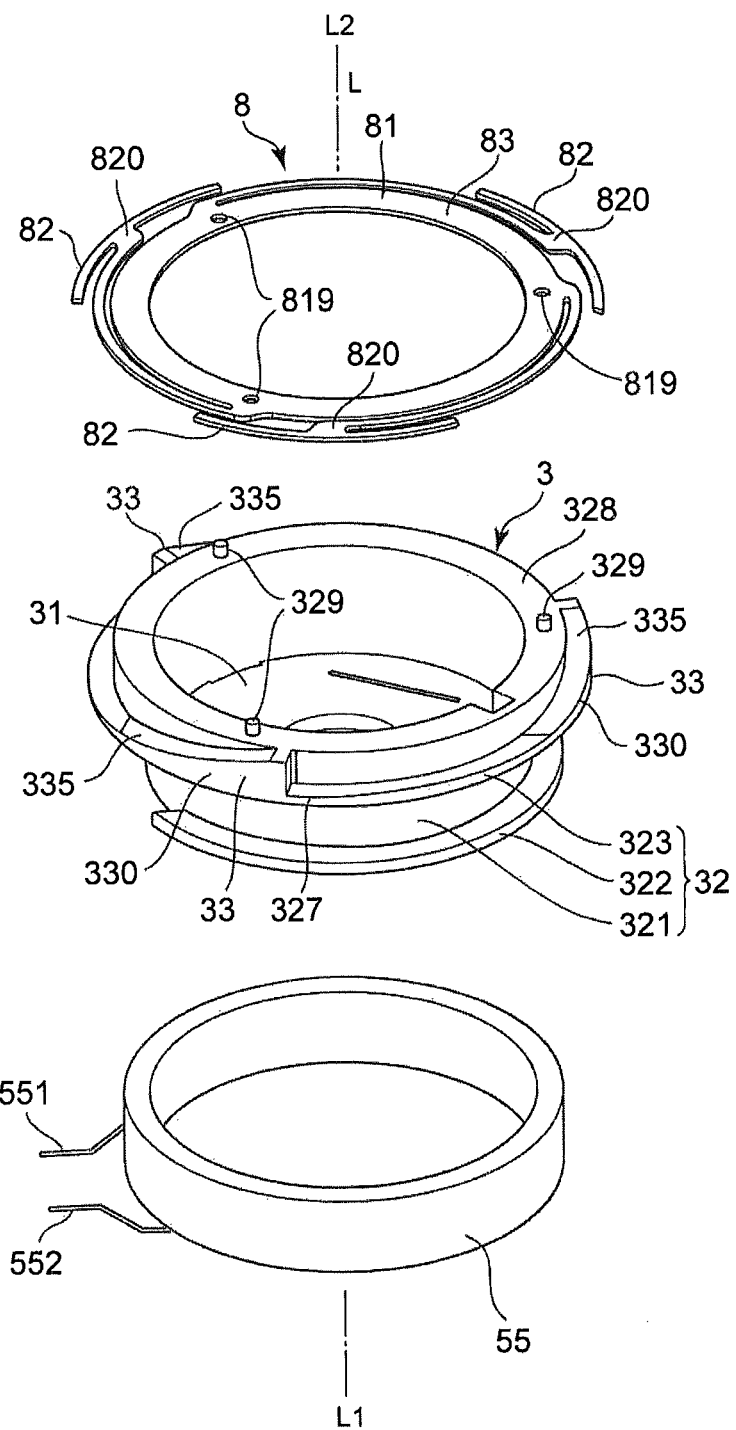
FIG. 5 is an exploded perspective view showing a view from the other side of an axial direction in a situation where the spring component, the coil bobbin, and the coil, being used in the linear actuator according to the first embodiment of the present invention, are disassembled.
Figure 6D:
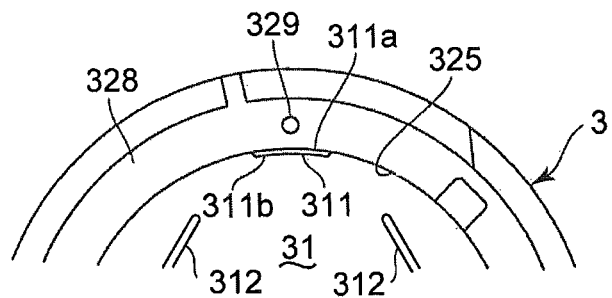
FIGS. 6(a) through 6(d) include explanatory drawings of the coil bobbin used in the linear actuator according to the first embodiment of the present invention.
Figure 6A:
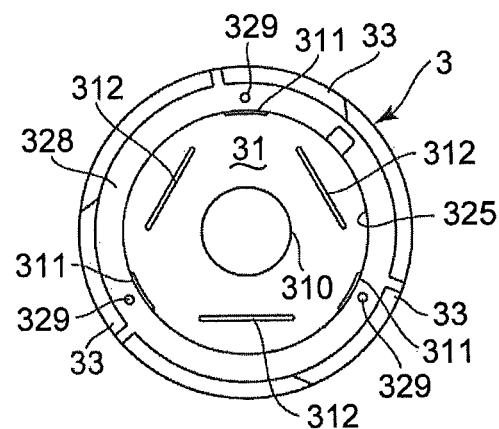
Figure 6B:
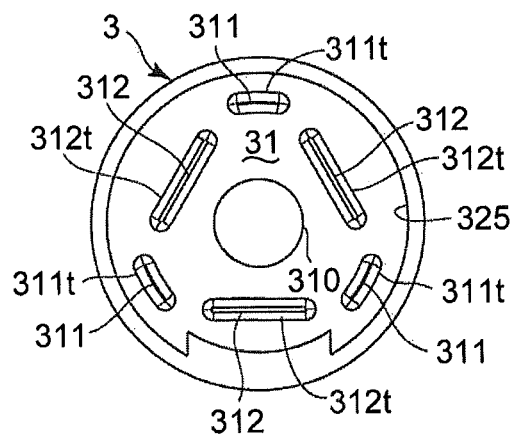
Figure 6C:
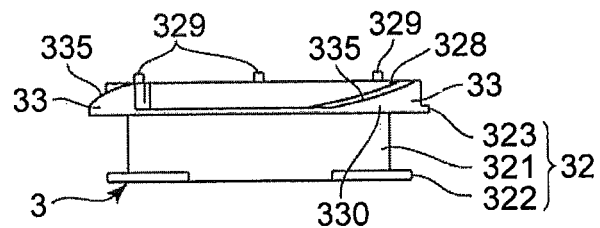

FIG. 4 includes perspective views showing a situation where a coil bobbin 3 around which a coil 55 is wound is equipped with the spring component 8, in the linear actuator 1 according to the first embodiment of the present invention; wherein, FIG. 4A and FIG. 4B are a perspective view of the coil bobbin 3, showing a view from the other side 'L2' in the direction of the axis line 'L', and a perspective view of the coil bobbin 3, showing a view from one side 'L1' in the direction of the axis line 'L', respectively. FIG. 5 is an exploded perspective view showing a view from the other side 'L2' in the direction of the axis line 'L' in a situation where the spring component 8, the coil bobbin 3, and the coil 55, being used in the linear actuator 1 according to the first embodiment of the present invention, are disassembled. FIG. 6 includes explanatory drawings of the coil bobbin 3 used in the linear actuator 1 according to the first embodiment of the present invention; wherein, FIG. 6A, FIG. 6B, FIG. 6C, and FIG. 6D are a plan view showing the coil bobbin 3 viewed from the other side 'L2' in the direction of the axis line 'L', a bottom plan view showing the coil bobbin 3 viewed from one side 'L1' in the direction of the axis line 'L', a side view of the coil bobbin 3, and an explanatory drawing that shows a situation in a magnified view, where a slit of the coil bobbin 3 is viewed from the other side 'L2' in the direction of the axis line 'L', respectively.

As shown in FIG. 2, FIG. 3B, FIG. 4, FIG. 5 and FIG. 6, the stationary element 2 has the coil bobbin 3 around which the coil 55 of the magnetic drive mechanism 5 is wound. The coil bobbin 3 is provided with a bottom plate part 31 that overlaps with the movable element 6 at one side 'L1' in the direction of the axis line 'L', and a cylindrical part 32 protruding from the bottom plate part 31 toward the other side 'L2' in the direction of the axis line 'L'. Then, the cylindrical part 32 surrounds the permanent magnet 53 at an outside in a radial direction, between the permanent magnet 53 and the side plate part 722 of the second core 72. Meanwhile, the stationary element 2 is provided with a fixing plate 4 that overlaps with the bottom plate part 31 of the coil bobbin 3, at an opposite side to the movable element 6 (at the one side 'L1' in the direction of the axis line 'L').

In the coil bobbin 3, the cylindrical part 32 includes; a tubular torso part 321 around which the coil 55 is wound; a first flange part 322 being annular, which is expanded in its diameter toward an outer side in a radial direction from an end part of the tubular torso part 321 at one side 'L1' in the direction of the axis line 'L'; and a second flange part 323 being annular, which is expanded in its diameter toward an outer side in a radial direction from the tubular torso part 321 at the other side 'L2' in the direction of the axis line 'L', in relation to the first flange part 322.

Incidentally, in a view from the direction of the axis line 'L', the second flange part 323 has a larger diameter than the first flange part 322 has. Accordingly, in a situation where the coil 55 is wound around the tubular torso part 321; the first flange part 322 protrudes a little out of an outer circumferential surface of the coil 55 toward the outer side in the radial direction, while the second flange part 323 protrudes quite a little out of the outer circumferential surface of the coil 55 toward the outer side in the radial direction, in comparison with the first flange part 322.

In the coil bobbin 3, there is provided the bottom plate part 31 from an end part of the cylindrical part 32 at one side 'L1' in the direction of the axis line 'L' toward an inner side in a radial direction; and a through hole 310 is formed at a center of the bottom plate part 31. In the meantime, the second flange part 323 is provided at one side 'L1' in the direction of the axis line 'L', in relation to a top end surface 328 of the tubular torso part 321.

As shown in FIG. 2 and FIG. 3, the fixed plate 4 includes; a disk plate part 41 that overlaps with the bottom plate part 31 of the coil bobbin 3 at an opposite side to the movable element 6 (at one side 'L1' in the direction of the axis line II); and a circuit board supporting part 42 being rectangular, which protrudes toward an outer side in a radial direction from a certain location in a circumferential direction of the disk plate part 41. A circuit board 46 is supported by the circuit board supporting part 42, and terminals 551 and 552 of the coil 55 are connected to the circuit board 46.

(Configuration of the Spring Member 8)

As shown in FIG. 2, FIG. 3B, FIG. 4, and FIG. 5, the spring member 8 is a flat spring component provided with a stationary-element-side connection part 81 connected to the stationary element 2 (the coil bobbin 3), a movable-element-side connection part 82 connected to the movable element 6 (the second core 72), and a plurality of arm parts 83 connected to the stationary-element-side connection part 81 and the movable-element-side connection part 82. In the present embodiment, the stationary-element-side connection part 81 is annular-shaped, and located at an inner side in a radial direction, in relation to the movable-element-side connection part 82 and the arm parts 83. Incidentally, in the stationary-element-side connection part 81, there is formed a hole 819 into which a protrusion 329 fits, the protrusion 329 protruding toward the other side 'L2' in the direction of the axis line 'L', from the top end surface 328 of the tubular torso part 321 of the coil bobbin 3; and under such a situation, the stationary-element-side connection part 81 and the top end surface 328 of the tubular torso part 321 are connected to each other.

The movable-element-side connection part 82 is divided into three parts in a circumferential direction; and then, the arm parts 83 individually stretch in the circumferential direction from the three movable-element-side connection parts 82. All of the three movable-element-side connection parts 82 are held by the cutout parts 763 at a time when the side plate part 762 of the first magnetic plate 76 and the torso part 781 of the third magnetic plate 78 are connected by way of welding and the like, as already explained with reference to FIG. 1 and FIG. 2.

(Configuration of First Slits 311 of the Bobbin 3)

Figure 7:
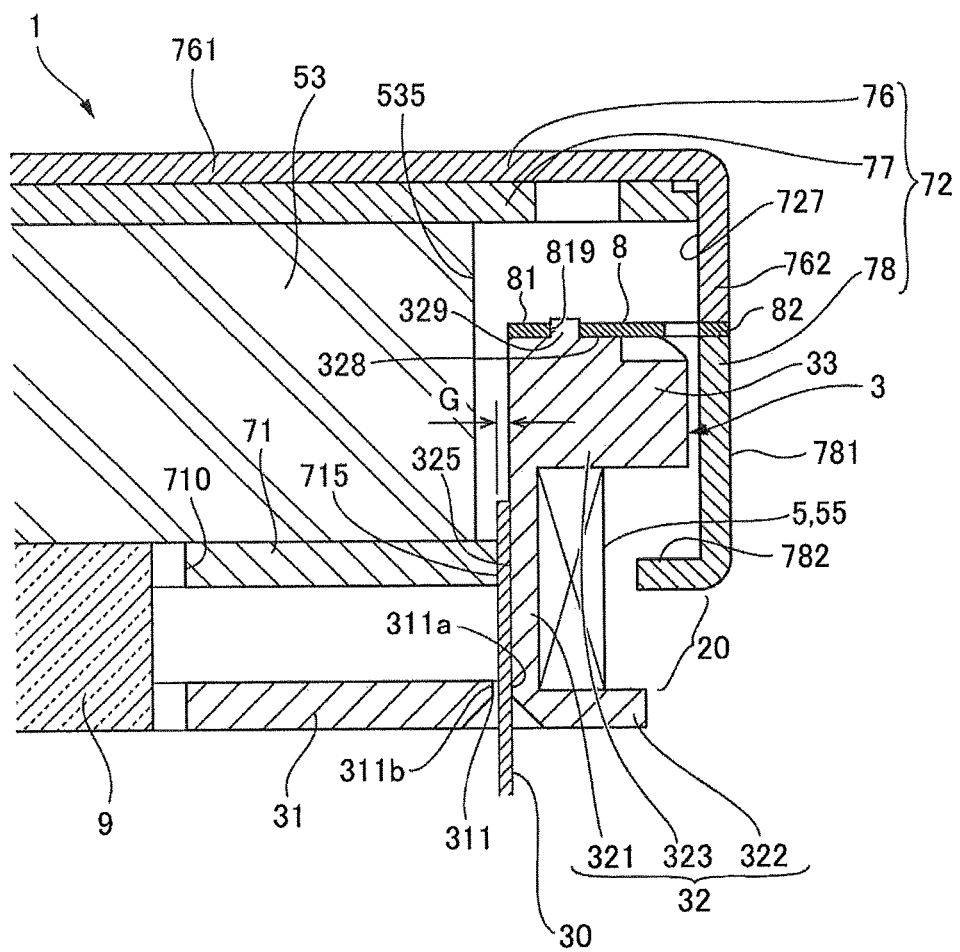
FIG. 7 is a magnified sectional drawing that shows a situation in a magnified view, where a jig is inserted through a first slit of the coil bobbin used in the linear actuator according to the first embodiment of the present invention.

FIG. 7 is a magnified sectional drawing that shows a situation in a magnified view, where a jig 30 is inserted through a first slit 311 of the coil bobbin 3 used in the linear actuator 1 according to the first embodiment of the present invention.

As shown in FIG. 4 and FIG. 5, in the coil bobbin 3, there are formed first slits 311, so as to be arc-shaped, in the bottom plate part 31, at a plurality of locations in a circumferential direction. Then, in a view from the direction of the axis line 'L', the first slits 311 are located at positions that overlap with a gap 'G' (refer to FIG. 3B and FIG. 7) between an inner circumferential surface 325 of the tubular torso part 321 (the inner circumferential surface 325 of the cylindrical part 32) and the outer circumferential surface 715 of the first core 71 of the movable element 6. More specifically to describe, as shown in FIG. 7, in a view from the direction of the axis line 'L', an outer circumferential rim 311a of the first slits 311 is located at a position that overlaps with the inner circumferential surface 325 of the tubular torso part 321 (the inner circumferential surface 325 of the cylindrical part 32), while an inner circumferential rim 311b of the first slits 311 is located at a position that overlaps with the outer circumferential surface 715 of the first core 71. As a result of that, positions of the permanent magnet 53 of the movable element 6 and the coil 55 of the stationary element 2 are precisely set up.

For such a configuration described above, in an assembly process for the linear actuator 1; at a time when fixing the movable-element-side connection part 82 of the spring member 8 to the second core 72, after fixing the stationary-element-side connection part 81 to the coil bobbin 3, a positioning step with respect to the movable element 6 and the coil bobbin 3 is carried out, by way of inserting the jig 30 (spacer), which is a thin plate, through the first slits 311 in order to have the jig 30 exist at the gap 'G' located between the inner circumferential surface 325 of the tubular torso part 321 (the inner circumferential surface 325 of the cylindrical part 32) and the outer circumferential surface 715 of the first core 71. Then, under the condition, the movable-element-side connection part 82 of the spring member 8 is fixed to the second core 72.

As shown in FIG. 4 and FIG. 6, in the bottom plate part 31 of the coil bobbin 3, there are formed second slits 312 at an inner side in a radial direction in relation to the first slits 311. At a time of fixing the fixed plate 4 to the bottom plate part 31 of the coil bobbin 3 by using an adhesive (not shown) after mounting the movable element 6 to the coil bobbin 3 by the intermediary of the spring member 8, positioning plates 43 that are cut out of the fixed plate 4 are fit into the second slits 312 so as to carry out a positioning step with respect to the coil bobbin 3 and the fixed plate 4.

At the time when the fixed plate 4 is fixed to the bottom plate part 31 of the coil bobbin 3 in this way by using the adhesive, the first slits 311 and the second slits 312 are blocked with the adhesive. Therefore, in an internal area of the stationary element 2, a space between the movable element 6 and the stationary element 2 is in communication with an exterior portion, by way of only an opening part 20 that opens toward an outside in a radial direction. Accordingly, the space between the movable element 6 and the stationary element 2 works as an air damper.

Incidentally, in the first slits 311 and the second slits 312, there are individually formed a taper surface 311t and a taper surface 312t, respectively; at each opening edge toward one side 'L1' in the direction of the axis line 'L'. Therefore, the jig 30 and the positioning plates 43 can easily be inserted into the first slits 311 and the second slits 312. Moreover, the adhesive easily flows into the first slits 311 and the second slits 312.

(Configuration of an Adhesive Component 45)

As shown in FIG. 1, FIG. 2, and FIG. 3, the fixed plate 4 is provided with an adhesive component 45 alongside of the opening part 20. In the present embodiment, the adhesive component 45 is either an adhesive tape or an application substance having an adherence property, which is stuck onto a surface of the fixed plate 4, at the other side 'L2' in the direction of the axis line 'L'. In the present embodiment, in a view from the direction of the axis line 'L', the adhesive component 45 is annularly formed alongside of a position that overlaps with an outer edge of the first flange part 322 of the coil bobbin 3, in the fixed plate 4.

(Configuration of a Reinforcing Rib 33 of the Bobbin 3)

In the linear actuator 1 according to the present embodiment, between the movable element 6 and the stationary element 2, there is configured a first stopper that regulates a movable range of the movable element 6 at a time when the movable element 6 moves in a direction perpendicular to the direction of the axis line 'L' owing to an external force, by use of an outer circumferential end part 327 of the second flange part 323; the outer circumferential end part 327 facing an inner circumferential surface 727 of the second core 72 at an inner side in a radial direction. Furthermore, between the movable element 6 and the stationary element 2, there is configured a second stopper that regulates a movable range of the movable element 6 at a time when the movable element 6 moves toward the other side 'L2' in the direction of the axis line 'L' owing to an external force, by use of the protrusion 723 of the second core 72 and the second flange part 323.

Incidentally, the second flange part 323 is a thin annular part, and it does not have sufficient strength as a stopper. Therefore, according to the present embodiment, there is configured a reinforcing rib 33 leading to the second flange part 323, at the other side 'L2' in the direction of the axis line 'L', in relation to the second flange part 323 in an outer circumferential surface of the cylindrical part 32 of the coil bobbin 3. In the present embodiment, an outer circumferential surface 330 of the reinforcing rib 33 overlaps with the outer circumferential end part 327 of the second flange part 323 in a view from the direction of the axis line 'L'.

In the meantime, the reinforcing rib 33 is located at a position displaced in a circumferential direction from a connecting location 820 for connection of the arm parts 83 to the movable-element-side connection part 82. Moreover, the reinforcing rib 33 has its slope surface 335 facing toward the other side 'L2' in the direction of the axis line 'L'; the slope surface 335 tilting from the other side 'L2' toward one side 'L1' in the direction of the axis line 'L', along an stretching direction of the arm parts 83; the slope surface 335 starting from the connecting location 820 for connection of the arm parts 83 to the movable-element-side connection part 82. In other words, the reinforcing rib 33 has its dimensions in a circumferential direction; wherein one dimension at one side 'L1' in the direction of the axis line 'L' is long, and the other dimension at the other side 'L2' in the direction of the axis line 'L' is short, and a longest part leads to the second flange part 323.

(Configuration of a Gel Damper Member 9)

As shown in FIG. 2 and FIG. 3, in the linear actuator 1 according to the present embodiment, a gel damper member 9 is placed between the stationary element 2 and the movable element 6 at a location on the axis line 'L'.

More specifically to describe, in the stationary element 2, the fixed plate 4 is a stationary-element-side facing part that faces the movable element 6 (the permanent magnet 53) at one side 'L1' in the direction of the axis line 'L', by the intermediary of the through the hole 710 of the first core 71 and the through hole 310 of the bottom plate part 31 of the bobbin 3; and in the direction of the axis line 'L', there is placed the gel damper member 9, being cylindrical, between the permanent magnet 53 and the fixed plate 4. In the meantime, the gel damper member 9 is fixed by way of having a surface, at one side 'L1' in the direction of the axis line 'L', fixed to the fixed plate 4 with an adhesive; and meanwhile, a surface at the other side 'L2' is fixed to the permanent magnet 53 with an adhesive. In this situation, the gel damper member 9 passes through inside the hole 710 of the first core 71, and inside the through hole 310 of the bottom plate part 31 of the bobbin 3.

In the present embodiment, the gel damper member 9 is made from silicone gel having a needle entering level of 90 to 110. The needle entering level shows a value of an entered depth of a ¼-cone needle stressed for five seconds, with a total load of 9.38 grams at 25 degrees Celsius, as specified in JIS-K-2207 or JIS-K-2220; wherein the entered depth being expressed in ⅒ mm. The smaller the value is, the harder the material is.

(Movement and Primary Effect of the Present Embodiment)

As explained above; in the linear actuator 1 according to the present embodiment; while energizing the coil 51 is halted, the movable element 6 is located at an origin position where a mass of the movable element 6 is balanced with a retaining force (a biasing force) of the spring member 8, as illustrated in FIG. 3B. Then, if the coil 51 is supplied with a sine wave, a reverse pulse, or the like under the condition, at first the movable element 6 receives a driving force by the magnetic drive mechanism 5 in such a way as to move toward one side 'L1' in the direction of the axis line 'L', against the biasing force of the spring member 8, as illustrated in FIG. 3C. A moving displacement stroke at the time is determined according to a current value of a current supplied to the coil 51 and the biasing force of the spring member 8. Then, after returning to the origin position by the biasing force of the spring member 8, the movable element 6 receives another driving force in a reverse direction, in such a way as to move toward the other side 'L2' in the direction of the axis line 'L', against the biasing force of the spring member 8, as illustrated in FIG. 3A. In this way, the movable element 6 vibrates in the direction of the axis line 'L'. A moving displacement stroke at the time is determined according to a current value of a current supplied to the coil 51 and the biasing force of the spring member 8. Moreover, a frequency of the vibration is determined according to a frequency of the current to be supplied to the coil 51. Therefore, an intensity level and a frequency of the vibration are variable.

Then, the movable element 6 is provided with the permanent magnet 53 being cylindrical, while the coil 55 is wound around the coil bobbin 3 that surrounds the permanent magnet 53 at an outside in a radial direction, in the stationary element 2. Therefore, the permanent magnet 53 and the coil 55 can have a large diameter. Moreover, the movable element 6 is provided with the first core 71 and the second core 72 at both sides of the permanent magnet 53 in the direction of the axis line 'L', so that a density of magnetic flux in linkage with the coil 55 is high. Therefore, even with a simple configuration provided with the permanent magnet 53 being a single set, a great thrust force can be supplied to the movable element 6.

Moreover, the spring member 8 is connected to the coil bobbin 3 that surrounds the permanent magnet 53 of the movable element 6, at the outside in the radial direction, in such a way that the movable element 6 is supported by the spring member 8, at the outside of the permanent magnet 53 in the radial direction. Accordingly, since the movable element 6 is supported in a stable condition by the spring member 8, no tilt is likely to happen to the movable element 6, even without supporting the movable element 6 by use of a supporting shaft. Therefore, according to the present embodiment, the linear actuator 1 can be configured with a limited number of constituent elements; and furthermore, an adequate vibration can be generated with the movable element 6.

Moreover, the first magnetic plate 76 and the second magnetic plate 77 are stacked together in the second core 72. Therefore, even in the case where a restriction on a thickness exists, owing to a limitation in a drawing process for the first magnetic plate 76, the end plate part 721 of the second core 72 can have a sufficient thickness. For example, the thickness of the end plate part 721 of the second core 72 (a sum of a plate thickness of the end plate part 762 and a plate thickness of the second magnetic plate 77) is thicker than the first core 71. Accordingly, the density of magnetic flux in linkage with the coil 55 can be made high so that a great thrust force can be supplied to the movable element 6.

Meanwhile, in the bottom plate part 31 of the coil bobbin 3, the first slits 311 overlapping with the gap 'G' in a view from the direction of the axis line 'L' are formed at a plurality of positions in a circumferential direction, the gap 'G' being configured between the inner circumferential surface 325 of the cylindrical part 32 of the coil bobbin 3 and the outer circumferential surface the movable element 6. Therefore, at a time of assembling the linear actuator 1, the gap 'G' can appropriately be provided between the inner circumferential surface 325 of the cylindrical part 32 and the outer circumferential surface of the movable element 6 by way of placing the jig 30, such as a spacer, through the first slits 311, as already explained with reference to FIG. 7. Accordingly, since a width of the gap 'G' can appropriately be set at any position in the circumferential direction, no tilt is likely to happen to the movable element 6, even without supporting the movable element 6 by use of a supporting shaft. In the meantime, the first core 71 has a larger diameter than the permanent magnet 53 has, so that the gap 'G' mentioned above is located between the inner circumferential surface 325 of the cylindrical part 32 and the outer circumferential surface 715 of the first core 71. Therefore, being compared to a case where a positioning process is carried out between the outer circumferential surface 535 of the permanent magnet 53 and the inner circumferential surface 325 of the cylindrical part 32, a positioning process between the outer circumferential surface of the movable element 6 and the inner circumferential surface 325 of the cylindrical part 32 can be carried out more easily.

In the meantime, a frequency of the vibration is determined on the basis of a frequency of a drive signal to be supplied to the coil 51. Under such a condition, sometimes the movable element 6 resonates at a frequency corresponding to a mass of the movable element 6 and a spring constant of the spring member 8. Meanwhile, in the present embodiment, the gel damper member 9 is provided between the fixed plate 4 of the stationary element 2 and the permanent magnet 53 of the movable element 6; and being deformed in conformity with a moving displacement of the movable element 6, the gel damper member 9 absorbs a vibration of the movable element 6. Therefore, a resonance of the movable element 6 can be suppressed. Then, the gel damper member 9 has a needle entering level of 90 to 110. Therefore, the gel damper member 9 has sufficient elasticity for demonstrating a damper function, and moreover it is unlikely that the gel damper member 9 becomes fractured and flies off. Moreover, the gel damper member 9 is adhered and fixed to both the movable element 6 and the stationary element 2; and therefore, it becomes possible to prevent the gel damper member 9 from displacement in association with the movement of the movable element 6.

Meanwhile, in the first core 71 and the bottom plate part 31 of the coil bobbin 3, there are formed the through hole 710 and the through hole 310 inside which the gel damper member 9 is located; wherein the gel damper member 9 is sandwiched between the fixed plate 4 and the permanent magnet 53 in the direction of the axis line 'L'. Therefore, being compared to a case where the gel damper member 9 is positioned between the movable element 6 and the coil bobbin 3, this case makes it possible to enlarge a space for a placement of the gel damper member 9, in the direction of the axis line 'L'. Accordingly, as the gel damper member 9, a component having a large dimension in the direction of the axis line 'L' can be placed so that a resonance of the movable element 6 can be suppressed far more sure.

In the meantime, the stationary element 2 is provided with the fixed plate 4 that overlaps with the bottom plate part 31 at a side opposite to the movable element 6; and therefore, the one side 'L1' in the direction of the axis line 'L' can be covered with the fixed plate 4, even though the first slits 311 and the like are formed in the bottom plate part 31. As a result of that, a foreign object is unlikely to enter a space between the outer circumferential surface 535 of the permanent magnet 53 and the inner circumferential surface 325 of the cylindrical part 32, and the like. Moreover, since the fixed plate 4 blocks the first slits 311 and the like, a space between the movable element 6 and the coil bobbin 3, as well as a space between the movable element 6 and the fixed plate 4 function as an air damper. Accordingly, a resonance of the movable element 6 can be suppressed far more sure, in comparison to a case where only the gel damper member 9 is used. Furthermore, a requirement expected of the gel damper member 9 can be eased.

Moreover, on a surface of the fixed plate 4 at the other side 'L2' in the direction of the axis line 'L', there is provided the adhesive component 45 alongside of the opening part 20 between the movable element 6 and the fixed plate 4. Therefore, a foreign object, such as dust trying to enter a space between the movable element 6 and the fixed plate 4 through the opening part 20, can be caught. Accordingly, such a foreign object is unlikely to enter the space between the outer circumferential surface 535 of the permanent magnet 53 and the inner circumferential surface 325 of the cylindrical part 32, and the like.

Meanwhile, in the present embodiment; the second flange part 323 of the coil bobbin 3 is used as a stopper, and the reinforcing rib 33 leads to the second flange part 323. Therefore, the second flange part 323 has a sufficient strength, and it is possible to configure the stopper by making use of the second flange part 323. Moreover, since the reinforcing rib 33 is provided at a position displaced in a circumferential direction from the connecting location 820 for connecting the movable-element-side connection part 82 of the spring member 8 and the arm parts 83, the reinforcing rib 33 and the arm parts 83 of the spring member 8 are unlikely to interfere with each other, even though the reinforcing rib 33 is provided to the coil bobbin 3. Furthermore, the reinforcing rib 33 has its slope surface 335 facing toward the other side 'L2' in the direction of the axis line 'L'; the slope surface 335 tilting from the other side 'L2' toward one side 'L1' in the direction of the axis line 'L', along an stretching direction of the arm parts 83; the slope surface 335 starting from the connecting location 820 for connection of the arm parts 83 to the movable-element-side connection part 82. Therefore, the reinforcing rib 33 can be formed in a wide range in the circumferential direction, while avoiding interference of the reinforcing rib 33 with the arm parts 83 of the spring member 8.

Second Embodiment

Figure 8:
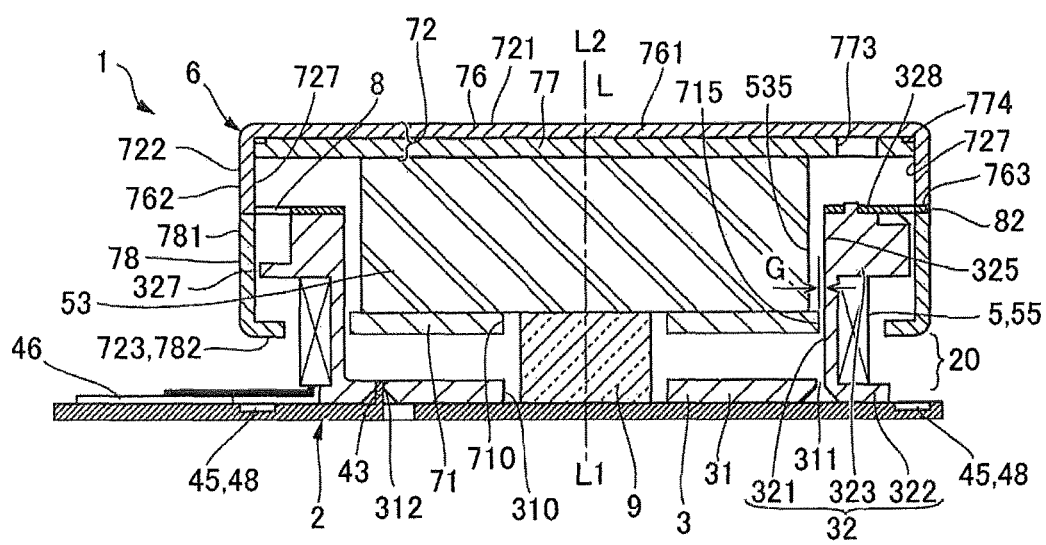
FIG. 8 is a sectional view of a linear actuator according to a second embodiment of the present invention.

FIG. 8 is a sectional view of a linear actuator 1 according to a second embodiment of the present invention. Incidentally, a fundamental configuration of the present embodiment is the same as a configuration of the first embodiment, and therefore a common symbol is provided to each common part, and an explanation for such a part is omitted.

While an adhesive tape or an application substance having an adherence property is provided in the first embodiment, as the adhesive component 45, on the surface of the fixed plate 4 at the other side 'L2' in the direction of the axis line 'L'; the adhesive component 45 may be provided in a groove 48, which is formed on the surface of the fixed plate 4 at the other side 'L2' in the direction of the axis line 'L', in the present embodiment, as shown in FIG. 8. According to the configuration, a space for placing the adhesive component 45 can easily be secured.

Other Embodiments

Although a configuration is employed in the embodiments described above, in such a way as to fix the gel damper member 9 with an adhesive; a precursor may be turned into a gel, after providing the precursor for forming the gel damper member 9, so as to fix the gel damper member 9 by making use of an adhesive property of its own of the gel damper member 9. For example, in the second embodiment; after providing an ultraviolet curable precursor for forming the gel damper member 9, the precursor may be turned into a gel by way of ultraviolet irradiation so as to fix the gel damper member 9 by making use of an adhesive property of its own of the gel damper member 9.

Although the gel damper member 9 in the embodiment described above is provided in alignment with the axis line 'L', another gel damper member 9 may be placed around the axis line 'L'. Furthermore, a gel damper member 9 may alternatively be placed around the axis line 'L', instead of being in alignment with the axis line 'L.'

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear actuator comprising:
   a movable element comprising a cylindrical permanent magnet;
   a stationary element comprising a coil bobbin that surrounds the permanent magnet at an outside in a radial direction;
   a spring member connected to the movable element and the coil bobbin, and supporting the movable element to be movable in an axial direction in relation to the coil bobbin;
   a coil wound around the coil bobbin, for configuring a magnetic drive mechanism together with the permanent magnet, the magnetic drive mechanism being structured to drive the movable element in the axial direction; and
   a gel damper member being sandwiched between the stationary element and the movable element in the axial direction.

2. The linear actuator according to claim 1;
wherein, the coil bobbin comprises a bottom plate part that overlaps with the movable element at a first side in the axial direction, and a cylindrical part protruding from the bottom plate part toward a second side in the axial direction so as to surround the permanent magnet at an outside in a radial direction; and
in the bottom plate part, a slit overlapping with a gap in a view from the axial direction is formed at a plurality of positions in a circumferential direction, the gap being configured between an inner circumferential surface of the cylindrical part and an outer circumferential surface of the movable element.

3. The linear actuator according to claim 2;
wherein, the movable element comprises a first core that overlaps with the permanent magnet at the first side in the axial direction, and a second core that overlaps with the permanent magnet at the second side in the axial direction;
the first core has a larger diameter than the permanent magnet; and
the gap is located between the inner circumferential surface of the cylindrical part and an outer circumferential surface of the first core.

4. The linear actuator according to claim 2;
wherein, the stationary element comprises a fixed plate that overlaps with the bottom plate part at a side opposite to the movable element.

5. The linear actuator according to claim 4;
wherein, the fixed plate covers the slit from a side opposite to the movable element.

6. The linear actuator according to claim 4;
wherein, in the first core and the bottom plate part, there are formed through holes inside which the gel damper member is located; and
the gel damper member is sandwiched between the fixed plate and the movable element in the axial direction.

7. The linear actuator according to claim 4;
wherein, between the fixed plate and the movable element, there stretches an opening part in a circumferential direction, which opens toward an outside in a radial direction; and
the fixed plate is provided with an adhesive component alongside of the opening part.

8. The linear actuator according to claim 7;
wherein, the adhesive component is provided in a groove that is formed on a surface of the fixed plate at the second side in the axial direction.

9. The linear actuator according to claim 1;
wherein, the gel damper member comprises silicone gel.

10. A linear actuator comprising:
a movable element comprising a permanent magnet;
a stationary element comprising a coil bobbin that surrounds the permanent magnet at an outside in a radial direction;
a spring member connected to the movable element and the coil bobbin, supporting the movable element to be movable in an axial direction in relation to the coil bobbin; and
a coil wound around the coil bobbin, for configuring a magnetic drive mechanism together with the permanent magnet, the magnetic drive mechanism being structured to drive the movable element in the axial direction;
wherein, the movable element is provided with a first core that overlaps with the permanent magnet at a the first side in the axial direction, and a second core that overlaps with the permanent magnet at a second side in the axial direction; and
the second core is provided with; a first magnetic plate including an end plate part that overlaps with the permanent magnet at the second side in the axial direction, and a side plate part cylindrically shaped, which stretches from an outer edge of the end plate part toward the first side in the axial direction so as to surround the coil at an outside in a radial direction; and a second magnetic plate being stacked on the end plate part.

11. The linear actuator according to claim 10;
wherein, a sum of a plate thickness of the end plate part and a plate thickness of the second magnetic plate is greater than a plate thickness of the first core.

12. The linear actuator according to claim 10;
wherein, the linear actuator includes a gel damper member being sandwiched between the stationary element and the movable element in the axial direction.

13. The linear actuator according to claim 12;
wherein, in the first core, there is formed a through hole inside which the gel damper member is located; and
the gel damper member is sandwiched between the permanent magnet and the stationary element.

14. The linear actuator according to claim 11;
wherein, the gel damper member comprises silicone gel.

15. A linear actuator comprising:
a movable element comprising a permanent magnet;
a stationary element comprising a coil bobbin that surrounds the permanent magnet at an outside in a radial direction;
a spring member connected to the movable element and the coil bobbin, supporting the movable element to be movable in an axial direction in relation to the coil bobbin; and
a coil wound around the coil bobbin, for configuring a magnetic drive mechanism together with the permanent magnet, the magnetic drive mechanism being structured to drive the movable element in the axial direction;
wherein, the movable element is provided with a first core that overlaps with the permanent magnet at a first side in the axial direction, and a second core that overlaps with the permanent magnet at a second side in the axial direction, the second core having an end plate part, a cylindrical side plate part stretching from an outer edge of the end plate part toward the second side in the axial direction so as to surround the coil at an outside in a radial direction, and a protrusion protruding from the side plate part toward an inner side in a radial direction; and
the coil bobbin includes; a tubular torso part around which the coil is wound, a first flange part which is expanded in its diameter toward an outer side in a radial direction from an end part of the tubular torso part at the first side in the axial direction, a second flange part which is expanded in its diameter toward an outer side in a radial direction from the tubular torso part at the second side in the axial direction in relation to the first flange part, the second flange part facing the protrusion at the second side in the axial direction, and facing an inner surface of the side plate part at an inner side in a radial direction, and a reinforcing rib leading to the second flange part, at the second side in the axial direction, in relation to the second flange part in an outer circumferential surface of the tubular torso part.

16. The linear actuator according to claim 15;

wherein, the spring member is a flat spring component comprising a stationary-element-side connection part connected to an end part of the tubular torso part at the second side in the axial direction, a movable-element-side connection part connected to the side plate part, and an arm part connected to the stationary-element-side connection part and the movable-element-side connection part; and the reinforcing rib is located at a position displaced in a circumferential direction from a connecting location between the movable-element-side connection part and the arm part.

17. The linear actuator according to claim 16;

wherein, the reinforcing rib has its slope surface facing toward the second side in the axial direction; the slope surface tilting from the second side toward the first side in the axial direction, along an stretching direction of the arm part; the slope surface starting from the connecting location for connection of the arm part to the movable-element-side connection part.

18. The linear actuator according to claim 15;

wherein, the linear actuator comprises a gel damper member being sandwiched between the stationary element and the movable element in the axial direction.

19. The linear actuator according to claim 18;

wherein, in the first core, there is formed a through hole inside which the gel damper member is located; and the gel damper member is sandwiched between the permanent magnet and the stationary element.

20. The linear actuator according to either of claim 18 or claim 19;

wherein, the gel damper member comprises silicone gel.

\* \* \* \* \*